Patented May 3, 1949

2,468,799

UNITED STATES PATENT OFFICE 2,468,799

HYDROGENATING FAT

Norbert W. Ziels, Leonia, and Werner H. Schmidt, Grantwood, N. J., assignors to Lever Brothers Company, Cambridge, Mass., a corporation of Maine No Drawing. Application October 20, 1943, Serial No. 507,014

6 Claims. (Cl. 260—409)

This invention relates to a new synthetic glyceride fat and method of preparing the same. More particularly, it relates to a fat prepared from normally liquid vegetable oils by a hydrogenation process, so as to have a maximum percentage of solids at room temperature and a minimum percentage of solids at body temperature, and preferably, also having a relatively sharp melting point at about body temperature.

It has been proposed previously in innumerable patents and publications, to hydrogenate oils so that they have a spreadable consistency at room temperature but are liquid at body temperature. Such hydrogenated oils have been proposed for use in connection with margarine where the product is to have the consistency of butter at room temperature, but is to melt in the mouth so as not to impart a greasy sensation. Such products, however, gradually soften as the temperature increases and are not characterized by a particularly sharp melting point.

Such margarine fats are to be distinguished from natural cacao butter, which is a solid, hard fat at room temperature and temperatures slightly above, such as 80° F., but becomes completely melted at about 95° F. Cacao butter is unique in its properties and is totally unlike any other natural or synthetic fats heretofore known.

In accordance with our invention, we have prepared a fat by hydrogenating a glyceride oil to produce a fat having properties sufficiently like those of natural cacao butter to be used as a substitute therefor. While it is sufficiently alike in physical properties to be used for purposes for which cacao butter is ordinarily intended, it is totally unlike cacao butter in its chemical constitution.

It is an object of our invention to produce a synthetic fat by hydrogenating oil so as to have a relatively sharp melting point at about body temperature.

A further object of our invention is to prepare a fat having a maximum of solids at room temperature, and a minimum of solids at body temperature.

A still further object of our invention is to accomplish this hydrogenation by means of a readily available catalyst which may be used repeatedly and under conditions of temperature and pressure which are relatively convenient to establish and maintain in a hydrogenating operation.

In accordance with our invention a normally liquid glyceride oil, such as peanut oil, cottonseed oil, or soybean oil, is hydrogenated with a catalyst containing a relatively large percentage of sulfur, referred to herein as a sulfurated catalyst. Such a catalyst is readily prepared by sulfurating oil and reacting the catalyst with the sulfurated oil.

Following are tables in which are listed conditions under which the invention may be practiced. Also included are similar characteristics of cacao butter and also oils hydrogenated in accordance with conventional prior art practices, in order that the distinguishing characteristics of the invention may be readily determined.

TABLE I

| No. | Prior Art | Invention | Sample | Hardening Specifications | | Catalyst | | | | |
|---|---|---|---|---|---|---|---|---|---|---|
| | | | | Temp. | Pressure | Ni. | Run No. | S added to Ni. | S in Cat. | S in Ni. |
| | | | | ° C. | Lbs./in.² | Per cent | | Per cent | Per cent | Per cent |
| 1 | X | | Cacao Butter | | | | | | | |
| 2 | | X | Peanut Oil | 170 | 20 | .5 | 5th | 3.75 | .78 | 3.65 |
| 3 | | X | do | 170 | 20 | .5 | 5th | | | 1.38 |
| 4 | | X | do | 170 | 20 | .1 | 1st | 1.75 | .66 | 1.81 |
| 5 | | X | Soybean Oil | 170 | 20 | .3 | 5th | 3.75 | .78 | 3.65 |
| 6 | | X | Cottonseed Oil | 170 | 20 | .3 | 5th | 3.75 | .78 | 3.65 |
| 7 | X | | Peanut Oil | 170 | 20 | .1 | 1st | 0 | .01 | .035 |
| 8 | X | | do | 170 | 20 | .2 | 5th | 0 | .09 | .52 |
| 9 | X | | do | 170 | 20 | .3 | 5th | 0 | .09 | .52 |
| 10 | X | | do | 170 | 20 | .5 | 8th | 0 | .10 | .74 |
| 11 | X | | Soybean Oil | 205-210 | 5.7 | .15 | | 0 | .09 | .66 |

TABLE II

| No. | Analysis | | Fatty Acid Composition | | | |
|---|---|---|---|---|---|---|
| | I. V. | M. P. | Solid Unsat. | Solid Sat. | Total Solid at 20° C. | Total Liquid at 20° C. |
| | | ° C. | Per cent | Per cent | Per cent | Per cent |
| 1 | 37.6 | 33.4 | 0.0 | 63.5 | 63.5 | 36.5 |
| 2 | 68.9 | 38.3 | 53.5 | 24.4 | 77.9 | 22.1 |
| 3 | | 37.1 | | | | |
| 4 | 69.2 | 36.7 | | | | |
| 5 | 78.6 | 39.0 | 40.6 | 18.4 | 59.5 | 40.5 |
| 6 | 74.2 | 38.3 | 31.4 | 26.2 | 58.1 | 41.9 |
| 7 | 54.9 | 44.4 | | | | |
| 8 | 68.0 | 36.8 | 26.3 | 27.3 | 53.6 | 46.4 |
| 9 | 56.2 | 44.1 | 33.6 | 40.9 | 74.5 | 25.5 |
| 10 | 53.5 | 45.2 | | | | |
| 11 | 76.5 | 38.0 | 31.6 | 19.2 | 51.3 | 48.7 |

TABLE III

| No. | Percent Solids | | | Penetration | | | | | | |
|---|---|---|---|---|---|---|---|---|---|---|
| | 68° F. | 97° F. | 107.5° F. | 35° F. | 61° F. | 70° F. | 80° F. | 90° F. | 95° F. | 100° F. |
| 1 | 64.0 | 0.0 | 0.0 | 5 | 17 | 18 | 40 | 200 | Liq. | Liq. |
| 2 | 62.8 | 3.2 | 0.0 | 10 | 20 | 25 | 80 | 270 | Liq. | Liq. |
| 3 | 51.5 | 1.8 | 0.0 | | | | | | | |
| 4 | 63.5 | 1.5 | 0.0 | | | | | | | |
| 5 | 59.0 | 6.6 | 0.0 | 13 | 25 | 37 | 71 | 240 | Liq. | Liq. |
| 6 | 60.0 | 9.1 | 0.0 | 22 | 38 | 40 | 63 | 245 | Liq. | Liq. |
| 7 | 63.8 | 20 | 4.4 | | | | | | | |
| 8 | 22.9 | 1.14 | 0.0 | 25 | 90 | 180 | 460 | Liq. | Liq. | Liq. |
| 9 | 66.0 | 24.3 | 5.2 | 10 | 24 | 25 | 46 | 96 | 142 | 207 |
| 10 | 62.7 | 23.0 | 6.7 | | | | | | | |
| 11 | 36.0 | 2.6 | 0.0 | 22 | 61 | 80 | 200 | 500 | Liq. | Liq. |

The method of preparing the samples listed in the tables will now be described:

Sample #1 (cacao butter)

Cacao butter has an iodine value of about 37.6 and a melting point of about 33.4. At 68° F. it has about 64% solids and at 97° F. it has 0% solids. The method of determining the percentage of solids at a given temperature will be described hereinafter.

An analysis of the fatty acid composition shows that cacao butter contains no solid unsaturated, i. e., iso-oleic, fatty acid; about 63.5% solid saturated fatty acid; and about 36.5% liquid fatty acids at 20° C. Its hardness as measured by a penetration test, to be described hereinafter, is relatively great up to and including a temperature of 80° F. Even at 90° F. it is slightly harder than a good grade of a commercial hydrogenated household shortening. At 95° F. it is completely melted. Cacao butter, therefore, is admirably suited for coatings for chocolates, ice cream, and other materials which will be relatively hard and firm up to temperatures normally encountered, namely, up to about 85° F., but which will completely melt into liquid when taken into the mouth. It is also suitable for cosmetics which are to have a firm texture, but melt to a liquid when applied to the skin.

Sample #2

In accordance with a preferred embodiment of the invention, flowers of sulfur was added to refined and bleached soybean oil in an amount of 1% sulfur based on the oil, and the mixture was heated for two hours at 95° C. with constant mechanical agitation. The temperature of the oil was then raised to 180° C. and agitated with a stream of carbon dioxide for two hours. The sulfurated oil thus prepared is used in making the catalyst. Refined and bleached soybean oil in an amount of 1500 grams and containing 5.0% of a "spent" (fifth-run) nickel catalyst was added to the sulfurated oil in an amount such that the sulfur in the sulfurated oil was 3.75% based on the amount of nickel in the catalyst.

A converter was charged with this mixture of refined and bleached soybean oil, spent catalyst and sulfurated oil, and the hardening operation carried out at a temperature of 170° C., under 20 pounds per square inch of hydrogen, until the oil reached an iodine value of 86 to 90. The charge was then cooled to 90° C. and filtered. Sulfurated catalyst, thus prepared, contained 3.65% sulfur on the nickel basis and was used in the hydrogenation of sample numbers 2, 5 and 6. While the amount of sulfur added to the catalyst by way of the sulfurated oil was calculated as 3.75%, based on the nickel in the catalyst, it was found by analysis that the percentage of sulfur in the catalyst based on nickel was 3.65%. This is a good check and indicates that substantially all of the sulfur in the sulfurated oil had combined with the catalyst. The total amount of the sulfur based on the weight of the catalyst (as distinguished from the nickel in the catalyst) was .78%.

The spent catalyst referred to above is a nickel hydrogenating catalyst that has been used to hydrogenate five different batches of oil. Nickel hydrogenating catalysts are sometimes formed by reducing a salt and supporting the nickel on a carrier. The catalysts become poisoned through use, such as by contact with sulfur and a wide variety of other materials.

Sample #2 was prepared by hydrogenating refined and bleached peanut oil with an amount of sulfurated catalyst prepared as just described, so that .5% nickel was used, at 170° C. and 20 pounds hydrogen pressure to a predetermined melting point. The product was found to have an iodine value of 68.9, almost double that of cacao butter. It had a melting point of 38.3° C. which is not appreciably higher than cacao butter. The amount of solids at 68° F. was found to be 62.8%, which closely approaches that in cacao butter, and the amount of solids at 97° F. was 3.2%. By extrapolation, the fat would have contained no solids at body temperature (98.6° F.). Analysis of the fatty acid composition showed the fat to contain 53.5% unsaturated solid fatty acid (iso-oleic), as distinguished from cacao butter which contains no iso-oleic acid. The total solid fatty acid content was 77.9% and the total liquid fatty acid content was 22.1%. Upon analysis of the product by the penetration test it was found to approach closely the physical properties of cacao butter; it is only slightly softer than cacao butter at 80° and 90° F., and is a liquid at 95° F. This product, in accordance with the invention, while approximating cacao butter in physical properties, is entirely different in chemical composition, and iodine value, since the major portion is iso-oleic acid.

*Sample #3*

A sample was prepared similar to that described in connection with sample #2, except that the amount of sulfur incorporated in preparing the sulfurated oil was such that the amount of sulfur in the finished catalyst was only 1.38%. Otherwise the conditions were the same. The melting point of the product was found to be slightly lower than that of sample #2 and approached more closely the melting point of cacao butter. The solid content at 68° F. was somewhat lower (51.5%), but not too low to interfere with the use of the composition as a substitute for cacao butter.

*Sample #4*

Sample #4 was prepared similar to that described in connection with sample #3, except that instead of using a fifth-run spent catalyst, a first-run catalyst was used in preparing the sulfurated catalyst and only one-fifth as much was used in the hydrogenation. The amount of sulfurated oil used was such as to form a sulfurated catalyst having 1.8% sulfur.

The iodine value of the product was about the same as sample #2, but the melting point was desirably somewhat lower (36.7°). The solids at 68° F. were 63.5%, and closely approached that of cacao butter and sample #2. The solids at 97° F. were 1.5%, which, by extrapolation, would be 0% at 98.6° F. The fatty acid composition tests, and penetration tests, were not made on samples #3 and #4 since it was apparent that from their melting point and the amount of solids at the various temperatures they would have large amounts of iso-oleic acid and have penetration curves following closely that of sample #2.

*Sample #5*

Sample #5 was prepared similar to sample #2 except that soybean oil was used instead of peanut oil and with an amount of a fifth-run catalyst to provide a .3% nickel in the charge. The iodine value of the product was somewhat higher in the case of soybean oil, but the melting point was of about the same order. The percent solids at 68° F. was found to be of the same order (59%) as in sample #2, but the amount of solids at 97° F. was slightly greater, namely 6.6%. While this is more than that of the preferred species, represented by sample #2, the small amount of solids (4% by extrapolation) at body temperature is not objectionable. Analysis for fatty acid composition also showed this sample to have a high iso-oleic acid content (40.6%) and to have a penetration curve closely following that of sample #2 and cacao butter.

*Sample #6*

Sample #6 was prepared following the identical procedure with sample #5, except that cottonseed oil was used instead of soybean oil. In the case of the cottonseed oil sample, the iodine value was found to be in between that of the peanut oil and the soybean oil samples. The melting point was about the same. The solids at 68° F. were desirably higher (60%), but the amount of solids at 97° F. was 9.1%. This approaches the maximum permissible in a product for this type of use. The fatty acid composition showed a high solid unsaturated fatty acid content, namely 31.4%, and a higher solid saturated fatty acid content than in the case of samples #2 and #5. This is attributable to the high palmitic acid content normally occurring in cottonseed oil. The properties of the product as determined by the penetration tests were found to be the most desirable of any of the samples, since the penetration at 35° F. is higher, and the penetration at 80° F. and 90° F. is lower, than that of sample #2.

The following samples #7 to #11 are representative of prior art procedures and are included in order to show the difference between the invention and the prior art.

*Sample #7*

This sample was prepared by hydrogenating peanut oil with a first-run nickel catalyst without the addition of any sulfur thereto and under otherwise the same conditions as the previous samples. An analysis of the catalyst showed the sulfur in the catalyst to be .01% which is equivalent to .035% based on the nickel. The product had an iodine value of 54.9 and at a melting point of 44.4° C., which is characteristic of a good shortening. An analysis of the solids showed the product to have 63.8% solids at 68° F. and 20% solids at 97° F. The latter is entirely too high to be useful as a cacao butter substitute. In view of the high percentage of solids found at 97° F. there was no point in making a fatty acid composition determination or a penetration test since the product obviously was not suitable for the purpose of the invention.

*Sample #8*

With a view to obtaining a less selective hydrogenating action, the same oil as in the previous sample was hydrogenated under the same conditions but using a larger amount of a fifth run catalyst. The amount of sulfur in the catalyst was .09% which is equivalent to .52% based on the nickel. The hydrogenation was also stopped somewhat sooner than in the previous sample so that the product had an iodine value nearer that of sample #2, namely 68.0. The melting point of the product was found to be 36.8° C., which is in the same general range as samples #2 and #6. The product, however, had a very small amount of solids at 68° F., namely 22.9%, an amount entirely too small to permit its use as a cacao butter substitute. This characteristic of the composition was confirmed by the penetration test which shows it to be relatively soft even at 70° F., and to be a mushy mixture at 80° F., and liquid at 90°. The penetration of this sample at 80° F., compared with the penetration of samples #2, #5 and #6, at the same temperature, demonstrates the difference between sample #8 and samples prepared in accordance with the invention.

*Sample #9*

This sample is similar to sample #7 in its physical characteristics but was prepared by using a larger amount of a spent catalyst, namely .3% of a fifth-run catalyst. The hydrogenation was carried to a point so that the product has about the same iodine value and melting point as sample #7. The product was found to have a large amount of solids at 97° F. (24.3%), entirely too high to serve as a cacao butter substitute. This high percentage of solids was revealed in the penetration tests, which showed the product to be relatively firm even at 100° F., and therefore unsuited for a cacao butter substitute.

Sample #10

This sample is similar to sample #9, except that a still larger amount of an eighth-run catalyst is used, namely .5%. The amount of sulfur in the catalyst based on the nickel is .74% and this represents about as much sulfur as is encountered in a catalyst in any of the prior art hydrogenating operations. The product was hydrogenated to an iodine value and a melting point in the same general range as samples #7 and #9, and upon analysis was found to have 23% solids at 97° F. The fatty acid composition determination and the penetration determination were not made since they would follow along the lines of sample #9. If the hydrogenation had been terminated sooner, so that the iodine value was similar to that of sample #2, the amount of solids at 68° F. would have been too low.

Sample #11

This sample was made with a nickel catalyst reduced at high temperatures and washed only slightly so as not to be entirely free from sulfates. It was made by taking 100 grams of nickel sulfate containing 6 molecules of water of crystallization dissolved in 700 cc. of distilled water, to which 60 grams of filtercel was added. The mixture was stirred and a solution of soda ash added until the mixture was slightly alkaline towards phenolphthalein. The precipitate formed was washed three times by decantation with distilled water. This procedure left a part of the sodium sulfate in the catalyst. The green precipitate was then filtered and excess water removed with a suction pump. The catalyst was dried at a temperature of 105° C. for 12 hours following which it was ground up to a fine powder and reduced in an atmosphere of hydrogen at a temperature of 427° C. for 10 hours. After this the reduced catalyst was cooled, and a stream of dried carbon dioxide passed over it. The catalyst was then added to soybean oil to protect it from oxidation. Analysis showed the catalyst to contain a .66% sulfur based on the nickel. Soybean oil was hydrogenated with this catalyst for three hours at a temperature of 205 to 210° C. under a pressure of 5.7 pounds per square inch. The amount of the catalyst used was such as to result in a product having not over 20% of saturated fatty acids in the glycerides and between 20 and 50% of iso-oleic acid in the glycerides. Analysis of the fatty acid composition shows it to contain 19.2% solid saturated fatty acids and 31.6% solid unsaturated (iso-oleic) acids. The liquid unsaturated fatty acids amount to 17.1%, of which less than 10% was linoleic acid. The product had an iodine value of 76.5 and a melting point of about 38° C. An analysis of the solids showed it to contain only 36% solids at 68° F., which is too low to permit the product to be used as a substitute for cacao butter. It is more suitable for purposes such as margarine which require a softer fat at this temperature. Its properties in this regard were confirmed by the penetration test, which showed it to have a penetration of 500, which is almost a soupy consistency at 90° F. At 80° F. its penetration is much higher than the product prepared in accordance with samples #2, #5 and #6.

In view of the above tests, and in view of many other tests of which those described are illustrative, we have determined that a fat made in accordance with our invention, and suitable for the purposes mentioned, should have a solid content at 68° F. of not less than 50%, and a solid content at 97° F. of not more than 10%. It should have a solid unsaturated fatty acid content of not less than 30%. It should have a penetration of not more than 100 at 80° F., and should be a liquid at 95° F., that is, it should assume the shape of container in which it is placed when at this temperature.

In view of the fact that we have found the process to be operative with peanut oil, cottonseed oil and soybean oil, which are quite widely divergent in their chemical composition, we are of the opinion that the process may be operated with any normally liquid glyceride oil. It is obvious from the disclosure herein that some oils will result in products more suitable for certain purposes than others, and the oil can be selected with a view to the purpose for which the product is to be used.

While we have referred on numerous occasions to the product as being a substitute for cacao butter, it is obvious that it may be used for other purposes where a fat of this property is desirable, such as compounding other edible products.

The catalyst used in the process should have not less than 1.38% sulfur based on the nickel. Amounts of sulfur greater than 5% based on the nickel are of no advantage and tend only to reduce the activity of the catalyst.

The hydrogenation may be carried out at a temperature range of 130 to 250° C. A range of 160 to 180° C. is preferred. Raising the temperature above the limit stated does not appear to benefit the action and there is no point therefore in utilizing the additional energy to obtain a higher temperature. Lowering the temperature seems only to reduce the activity of the catalyst.

The hydrogenation pressure may vary from 5 to 100 pounds per square inch without altering the nature of the hydrogenation. The activity naturally suffers with lower pressures.

The amount of the catalyst in terms of the amount of nickel therein may vary from .05 to 1% nickel without affecting the nature or the selectivity of the reaction.

The sulfur may be introduced into the catalyst by means of the method disclosed or any other convenient method of introducing sulfur, such as by reacting it with sulfur in other mediums or other forms, such as sodium sulfide. The catalyst which is to be sulfurated with additional sulfur may be either a fresh or a spent catalyst.

With reference to the data in the tables and the examples, the iodine value and melting point are determined by standard methods of analyzing fat which are described in any book on oil and fat analysis.

The solids present at various temperatures is arrived at by calculation from dilatation measurements. This method is well-known in the art and is described in an article by C. A. Coffey and H. T. Spannuth appearing at pp. 41–42, February 1940 issue of the publication "Oil & Soap." The dilatometer method of measuring liquid and solid fats may be described briefly as the measurement of the volume of a fat and oil mixture at a temperature intermediate the temperature at which the mixture is completely liquid and the temperature at which it is completely solid. Calculating from these volumes, the ratio of solids-to-liquid existing at the intermediate temperature can be measured. This test is based on the fact that the same amounts of glycerides have a different density in liquid form than in solid form and therefore a different volume. It will be appreciated, therefore, that as some of the components of glyceride mixture melt or solidify there will be a change in volume which is an effective measurement of the solid-to-liquid components at the temperatures measured. The difference between the dilatometer reading when the mixture is all liquid and when it is all solid may be divided into 100 equal scale divisions with the all solid product designated as 100 and the all liquid as zero. The reading at any point within this range on this scale will be the percent of solids at the temperature measured.

The fatty acid composition referred to in the tables and the examples is arrived at by a standard analysis utilizing lead salts. The solid fatty acids are precipitated as lead salts whereas the liquid fatty acids are not. The amounts can be determined by such a quantitative analysis. The solid fatty acids are liberated from the lead salts and are analyzed by means of the iodine value test and Kaulfmann value test from which it is possible to calculate the saturated and unsaturated solid fatty acids.

The penetration tests are made with a penetrometer of the type specified by the A. S. T. M. for determining the hardness of greases and bituminous substances (see "Oil & Soap" for March 1942, vol. XIX, No. 3, pp. 55–56) except that the conical shaped needle is made of aluminum and weighs 47 grams. The construction and operation of this instrument is understood by those skilled in the art.

When a penetration determination is to be made on a sample of fat at an indicated temperature, it is kept at this temperature ±1° F. for at least 24 hours before taking the penetration reading. The surface of the fat sample to be tested is then scraped smooth and placed under the needle of the penetrometer. The tip of the needle is lowered so that it just touches the smooth surface of the fat. The penetrometer recording shaft is then lowered so as to be in contact with the end of the needle spindle. When the parts are in this position, the penetrometer dial is turned to the zero reading without disrupting the positions of the needle spindle or recording shaft. The needle is then elevated an amount equivalent exactly 200 scale divisions on the indicator. The needle is then released quickly by pressing the knob on the penetrometer for this purpose. The needle falls and sinks into the fat a given distance, depending on the hardness or softness of the fat at the temperature at which it is tested. The recording shaft is then lowered until it just touches the end of the needle spindle. The reading on the indicator dial is known as the penetration.

While we have described a preferred embodiment of our invention, it will be obvious that it includes many variations within the generic disclosure. All of these, as are within the claims, are intended to be included.

We claim:

1. A method of producing a fat solid at room temperature but substantially liquid at body temperature, which comprises hydrogenating a normally liquid glyceride oil selected from the group consisting of peanut oil, cottonseed oil and soy bean oil, with a nickel catalyst containing 1.38 to 5% sulfur based on nickel, at a temperature of 130 to 250° C., and at a pressure of 5 to 100 pounds per square inch hydrogen.

2. A method of producing a fat which comprises hydrogenating a normally liquid glyceride oil selected from the group consisting of peanut oil, cottonseed oil and soy bean oil with 0.05% to 1% of a nickel catalyst containing 1.38 to 5% sulfur based on nickel, at a temperature of 130 to 250° C., and at a pressure of 5 to 100 pounds per square inch hydrogen to obtain a product having at least 50% solids at 68° F. and not more than 10% solids at 97° F., an iso-oleic acid content of not less than 30%, and a penetration measured as described herein of not more than 100 at 80° F., and a liquid at 95° F.

3. A method of producing a fat which comprises hydrogenating peanut oil with a nickel catalyst containing 1.38 to 5% sulphur based on nickel, at a temperature of 130 to 250° C., and at a pressure of 5 to 100 pounds per square inch hydrogen to obtain a product having at least 50% solids at 68° F., and not more than 10% solids at 97° F., an iso-oleic acid content of not less than 30%, and a penetration measured as described herein of not more than 100 at 80° F., and a liquid at 95° F.

4. A method of producing a fat which comprises hydrogenating peanut oil with about .5% of a nickel catalyst containing about 3.65% sulfur based on nickel, at a temperature of about 170° C., and at a pressure of about 20 pounds per square inch hydrogen to obtain a product having not less than 60% solids at 68° F., and not more than 4% solids at 97° F., an iso-oleic acid content of not less than 45%, and a penetration measured as described herein of not more than 100 at 80° F., not more than 300 at 90° F., and a liquid at 95° F.

5. A method of producing a fat solid at room temperature and substantially liquid at body temperature, which comprises preparing a sulfurated oil by heating a glyceride oil with sulfur, hydrogenating a mixture comprising a nickel catalyst and the sulfurated oil to prepare a catalyst having 1.38% to 5% sulfur based on the nickel in the catalyst, preparing a hydrogenating charge comprising a glyceride oil selected from the group consisting of peanut oil, cottonseed oil and soy bean oil, and 0.05% to 1% of the prepared nickel catalyst and subjecting the oil to hydrogenation under a pressure of 5 to 100 pounds per square inch and at a temperature of 130 to 250° C.

6. A method of producing a fat solid at room temperature and substantially liquid at body temperature, which comprises preparing a sulfurated oil by heating a glyceride oil with sulfur, hydrogenating a mixture of a glyceride oil, a spent nickel catalyst and the sulfurated oil in an amount to provide 1.38% to 5% sulfur based on the nickel in the catalyst, preparing a hydrogenating charge comprising a refined and bleached peanut oil and about .5% of the prepared nickel catalyst, and subjecting the oil to hydrogenation under a pressure of about 20 pounds per square inch hydrogen and at a temperature of 170° C. for a length of time to reduce the iodine value of the oil to about 68–69, whereby there is obtained a product having not less than 60% solids at 68° F. and not more than 4% solids at 97° F., an iso-oleic acid content of not less than 45%, and a penetration measured as described herein of not more than 100 at 80° F., not more than 300 at 90° F., and a liquid at 95° F.

NORBERT W. ZIELS.
WERNER H. SCHMIDT.

(References on following page)

REFERENCES CITED

The following references are of record in the file of this patent:

UNITED STATES PATENTS

| Number | Name | Date |
|---|---|---|
| 2,119,141 | Ralston | May 31, 1938 |
| 2,163,603 | Jenness | June 27, 1939 |
| 2,164,291 | Jenness | June 27, 1939 |
| 2,165,530 | Bertram | July 11, 1939 |

OTHER REFERENCES

Sanders et al. v. Coe, 23 J. P. O. S. 778.